United States Patent [19]

Chan

[11] Patent Number: 5,313,621

[45] Date of Patent: May 17, 1994

[54] PROGRAMMABLE WAIT STATES GENERATOR FOR A MICROPROCESSOR AND COMPUTER SYSTEM UTILIZING IT

[75] Inventor: Stephen H. Chan, Sunnyvale, Calif.

[73] Assignee: Zilog, Inc., Campbell, Calif.

[21] Appl. No.: 34,610

[22] Filed: Mar. 22, 1993

Related U.S. Application Data

[63] Continuation of Ser. No. 526,115, May 18, 1990.

[51] Int. Cl.$^5$ .............................................. G06F 1/04
[52] U.S. Cl. .............................. 395/550; 364/DIG. 1; 364/271.6; 364/271.8; 364/DIG. 2; 364/934; 364/941; 364/941.91
[58] Field of Search ........................................ 395/550; 364/200 DIG. 1, 900 DIG. 1

[56] References Cited

U.S. PATENT DOCUMENTS

| | | | |
|---|---|---|---|
| 3,757,306 | 9/1973 | Boone | 395/800 |
| 4,014,006 | 3/1977 | Sorensen et al. | 395/550 |
| 4,414,664 | 11/1983 | Greenwood | 371/37.3 |
| 4,507,732 | 3/1985 | Catiller et al. | 395/275 |
| 4,509,120 | 4/1985 | Daudevin | 395/550 |
| 4,727,491 | 2/1988 | Culley | 395/500 |
| 5,021,985 | 6/1991 | Hu et al. | 364/748 |
| 5,125,088 | 6/1992 | Culley | 395/500 |
| 5,151,979 | 9/1992 | Poskitt | 395/325 |
| 5,159,679 | 10/1992 | Culley | 395/550 |

OTHER PUBLICATIONS

Zilog, Inc., Z80 Family Data Book, Product Specification, Jan. 1989.

Primary Examiner—Dale M. Shaw
Assistant Examiner—Lance L. Barry
Attorney, Agent, or Firm—Majestic, Parsons, Siebert & Hsue

[57] ABSTRACT

An electronic circuit employed in a microprocessor system inserts a programmable number of wait states in a machine cycle of the microprocessor in response to a specific operational code of the microprocessor's instruction set being detected on a system data bus. A particular application of the wait state generation circuit is to provide enough time for a control signal to propagate along a plurality of daisy-chained peripherals before the microprocessor machine cycle ends. The wait state generation circuit may be provided as part of the microprocessor on a single integrated circuit chip.

5 Claims, 3 Drawing Sheets

Z80 SYSTEM WITH RETI WAIT STATES GENERATOR TO ACCOMODATE N Z80 FAMILY PERIPHERALS

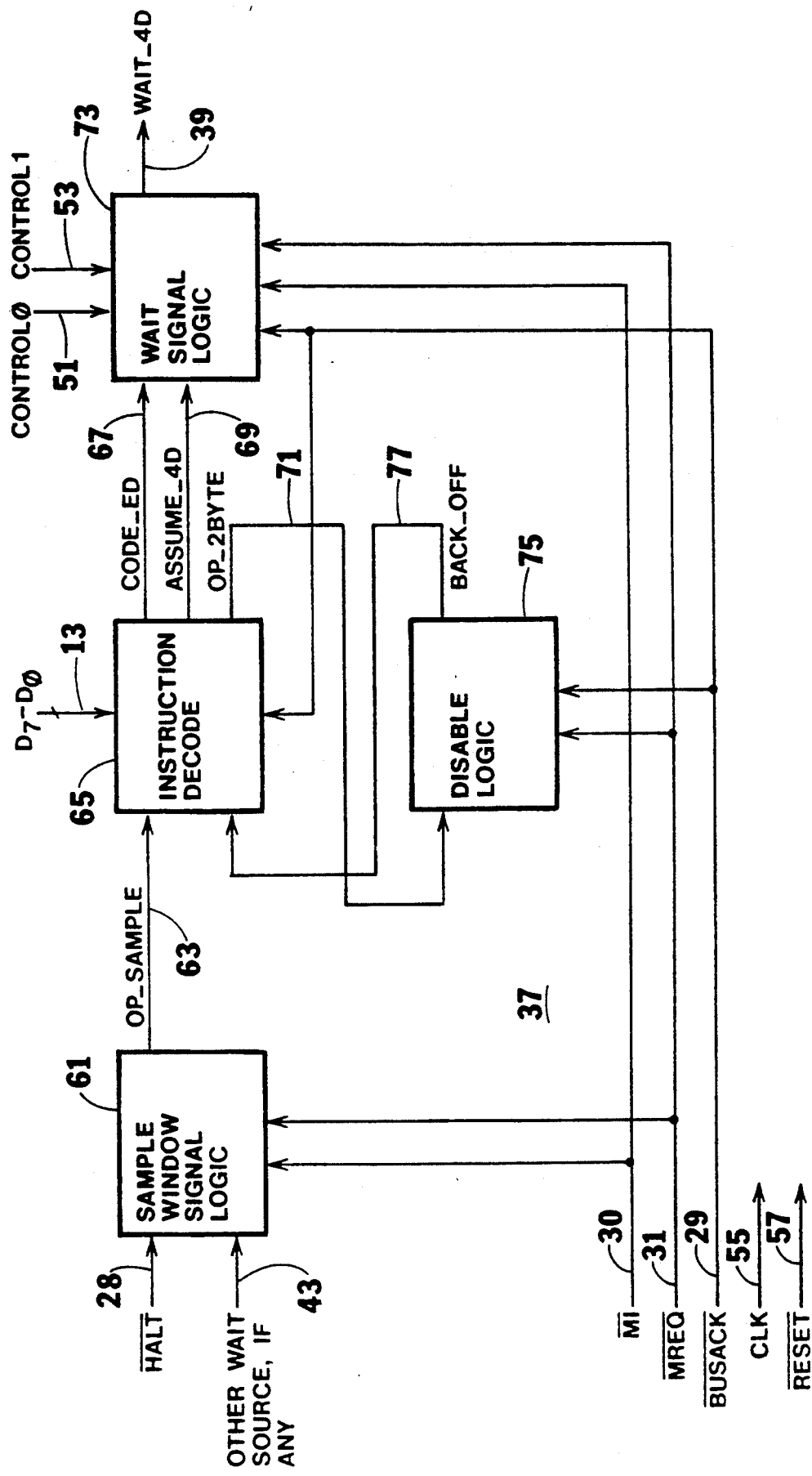
FIG._2. RETI WAIT STATES GENERATOR BLOCK DIAGRAM

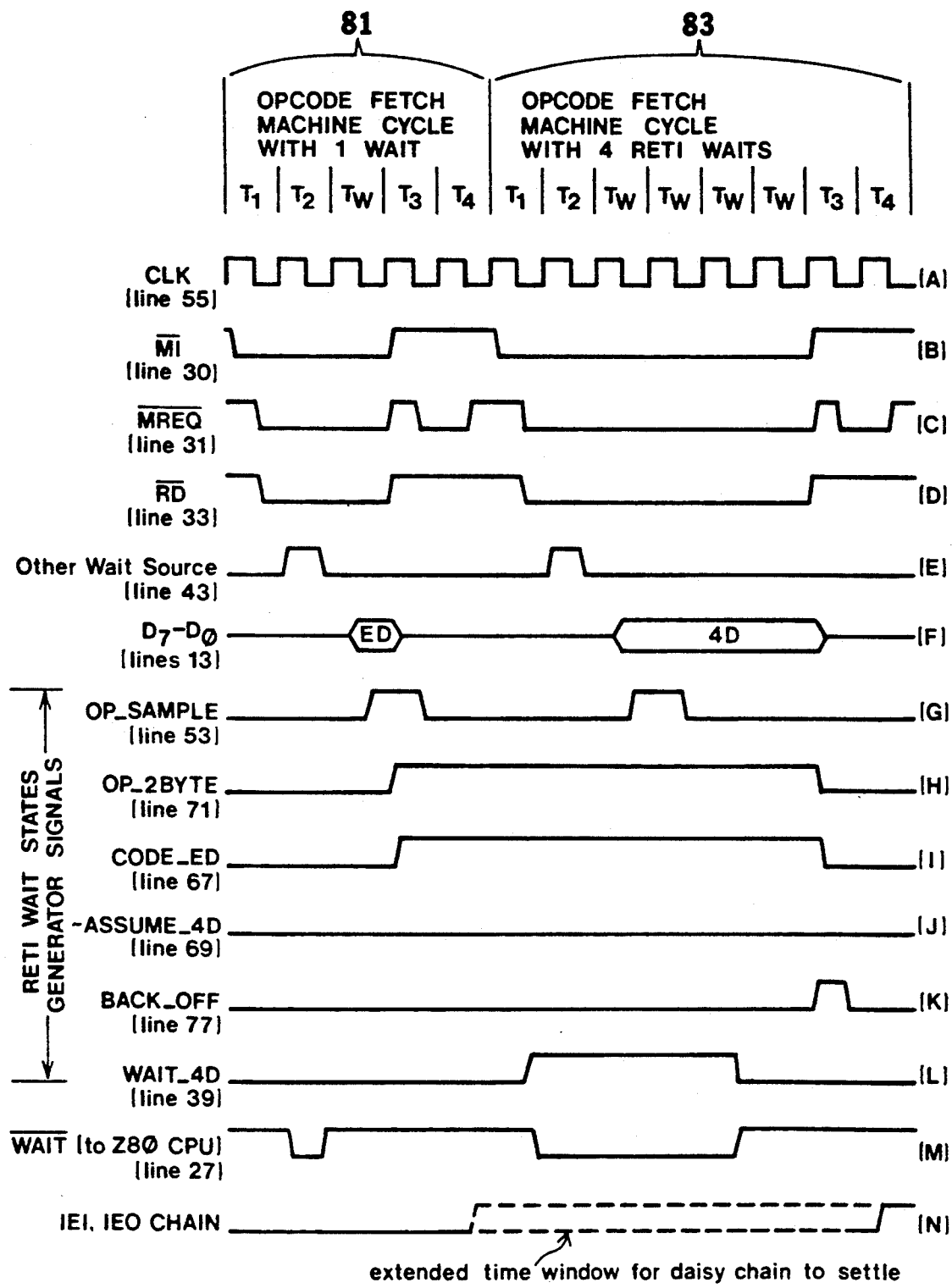
FIG._3.
4D OPCODE FETCH MACHINE CYCLE
EXTENDED WITH 4 RETI WAITS

PROGRAMMABLE WAIT STATES GENERATOR FOR A MICROPROCESSOR AND COMPUTER SYSTEM UTILIZING IT

This is a continuation of application Ser. No. 07/526,115, filed May 18, 1990.

FIELD OF THE INVENTION

This invention relates generally to a component for a microprocessor system and a system using such a component, and, more specifically, a component that coordinates timing of operation between a central processing unit and peripheral or other system circuits.

BACKGROUND OF THE INVENTION

The basic arrangement of a typical microprocessor based computer system is well known. Connected to a common system data bus are a microprocessor, various types of memory, peripheral input/output circuits, and the like. In addition to being commonly connected by the system data bus, a number of control and status lines also interconnect the circuit elements. The microprocessor communicates with all these system circuits, one at a time.

A popular and widely used microprocessor system is a family of Z80® brand components marketed by Zilog, Inc. of Campbell, Calif., assignee of the present application. In order to reduce hardware interconnections between a microprocessor chip and a number of peripheral input/output chips that might be utilized in a given system, the Z80 system contemplates connecting the peripheral circuit chips with each other and the microprocessor by use of a daisy chain interrupt circuit scheme. This system prioritizes the various peripherals in order to resolve competing interrupt requests from two or more of them. The microprocessor, of course, can service only one peripheral at a time. A detailed technical discussion of the Z80 microprocessor and peripherals is set forth in a book entitled "Z80 Family Data Book", dated January 1989, available from Zilog, Inc. The Z80 family components interrupt structure, including the daisy-chained interconnection of Z80 peripherals, is described at pages 293-304 of this book.

In such a peripheral connection system, there is an inherent propagation delay of an interrupt enable signal through the daisy chain circuit. When the Z80 system was first introduced many years ago, the microprocessor was operated at a slow enough clock speed that its multiple clock period machine cycles were long enough to allow sufficient time for this signal to propagate along the entire peripheral daisy chain circuit during such cycles. This is required for certain peripheral interrupt acknowledge and return from interrupt communications between the microprocessor and a selected peripheral.

However, in more recent times, clock speeds increased and the same microprocessor machine cycles are accomplished in a much shorter period of time while the propagation delay of a given daisy-chained peripheral circuit has not been reduced by the same proportion. As a result, a problem in acknowledging an interrupt request from a peripheral was noted in certain situations. If the highest priority peripheral issues an interrupt request, at the beginning portion of the microprocessor interrupt acknowledge machine cycle that is in response to an interrupt signal issued by the lowest priority peripheral, enough time must be provided in the interrupt acknowledge machine cycle to allow a logic low interrupt enable signal of the highest priority peripheral to travel the full length of the chain and inhibit the lowest priority peripheral from thinking that the interrupt acknowledge machine cycle issued by the microprocessor is for it. One of the methods to resolve this problem is to add a circuit that inserts one or more wait states in the interrupt acknowledge machine cycle to delay the active edge of the microprocessor control signal IORQ, as described on pages 300 and 301 of the Zilog book cited above.

More recently, with microprocessor speeds increasing even further, it has been found that a return from interrupt (RETI) operation can require more time to effect than allowed during a microprocessor opcode fetch machine cycle, depending upon the type and number of peripherals that are daisy-chained together. A logic high signal must propagate completely down the daisy chain during that machine cycle in order to assure that the correct one peripheral is enabled to act upon the RETI instruction.

It is an object of the present invention to provide a technique and circuit for solving such a timing problem in a straightforward and simple way that does not compromise operation of the system.

SUMMARY OF THE INVENTION

This and additional objects are accomplished by the present invention, wherein, briefly and generally, a circuit is connected to the microprocessor to insert wait states in an operational machine cycle in response to a particular operational code of the microprocessor's instruction set being detected on the system data bus. Such a wait states generator may be supplied as a separate integrated circuit chip that is incorporated with the other circuit chips to make up the computer system. However, in light of current high density integrated circuit techniques, it is generally preferable to provide the wait states generator as part of the same circuit chip as the microprocessor.

In a specific form, such a wait states generator is designed to detect the return from interrupt (RETI) operational code of the instruction set of the Z80 microprocessor. That processor reads the RETI code onto the system data bus after an interrupt operation initiated by one of several daisy-chained peripherals has been completed. By lengthening the microprocessor machine cycle that fetches this operational code from memory, more time is given for the peripheral to detect from the data bus that an operation initiated by an interrupt from it has now been completed. The added time is desirably provided for those cases where the propagation of a control signal along the daisy chain to alert the peripheral that the RETI code is for it takes longer than the normal operational code machine cycle of the microprocessor. By lengthening that machine cycle, the RETI instruction remains on the data bus for a longer period of time. This technique does not significantly slow down the speed of operation of the microprocessor system.

Additional objects, advantages and features of the various aspects of the present invention will become apparent from the following description of a preferred embodiment thereof, which description should be taken in conjunction with the accompanying drawings.

BRIEF DESCRIPTION OF THE DRAWINGS

FIG. 2 is a block diagram of one of the components of the system of FIG. 1; and

FIGS. 3A-3N are waveforms showing the operation of the microprocessor system of FIGS. 1 and 2.

DESCRIPTION OF A PREFERRED EMBODIMENT

Figure 1:
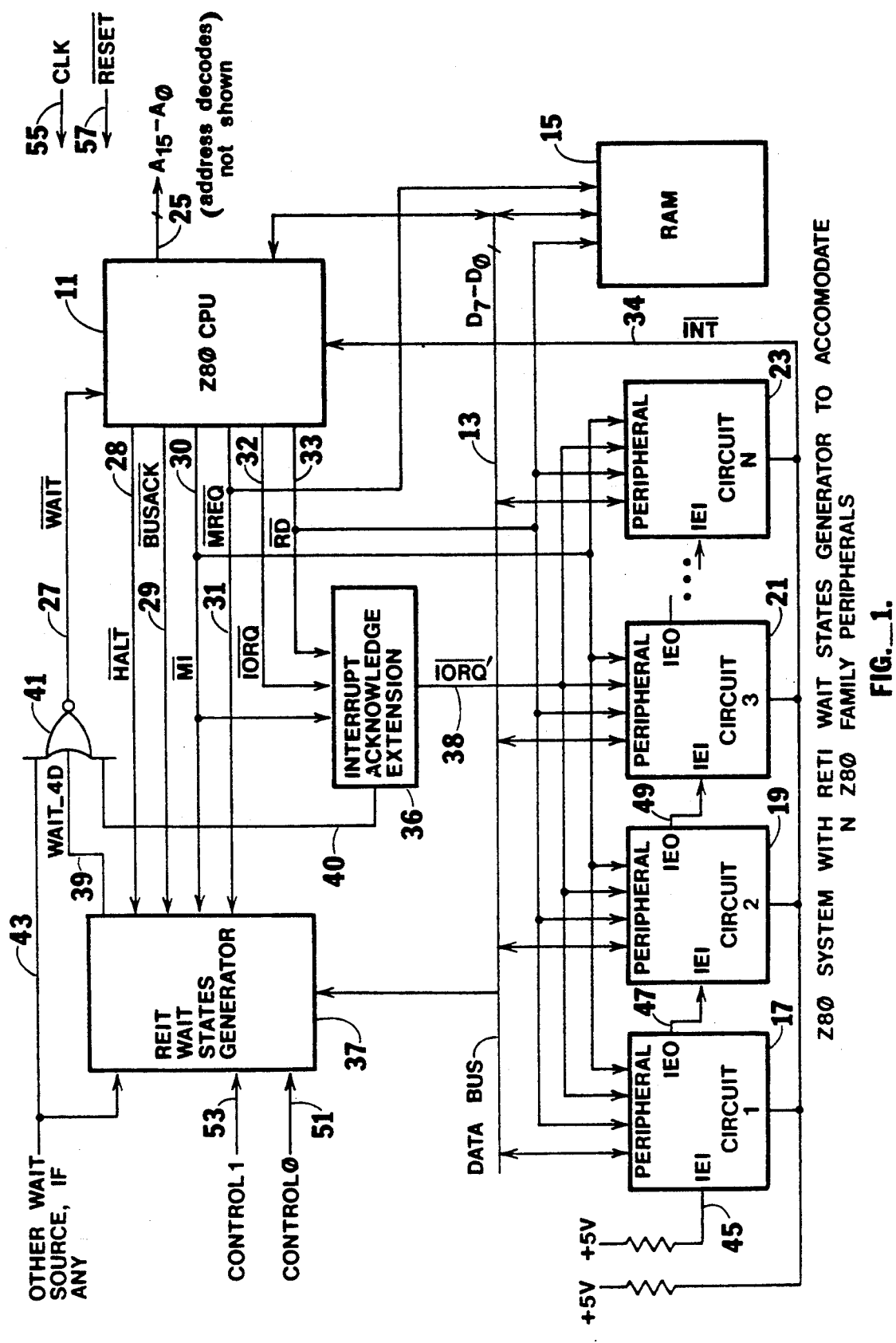
FIG. 1 is a block diagram representation of a computer system employing the improvement of the present invention.

Referring to FIG. 1, a computer system is shown that utilizes a microprocessor 110. In this example, the microprocessor is a Z80 ® central processing unit (CPU). A data bus 13 provides a path of communication between the microprocessor 11 and other computer system elements, such as random access memory 15, and a plurality of peripheral input/output circuits 17, 19, 21 and 23. The Z80 CPU is an 8-bit device. Thus, the data bus 13 is also 8 bits in width. An address bus 25 is 16 bits in width. Various of control and status signal connections 27-34 of the Z80 CPU are also shown in FIG. 1, their use in a system employing the present invention being described below.

The portion of the computer system of FIG. 1 described so far is a standard Z80 microprocessor system utilizing individual integrated circuit chips available from Zilog, Inc. The peripheral input/output circuit chips 17, 19, 21, and 23 can be selected from, as examples, a parallel input/output circuit (PIO), serial input/output controller circuit (SIO), counter/timer circuit (CTC), and serial/parallel/ counter/timer circuit (KIO). The number and type of such peripheral circuits that are utilized in any given computer system will depend upon its particular application. Two or more of one type of such peripheral circuits can be utilized. A detailed technical discussion of the microprocessor and peripheral chips of FIG. 1 exists in the aforementioned Zilog book.

What is new in the system of FIG. 1, according to the present invention, is a wait states generator 37. The circuit 37 is connected with a data bus 13 and generates a wait states signal in an output 39 in response to detection of a particular operational code from the Z80 microprocessor instruction set. That signal is applied through a NOR-gate 41 to the WAIT control input pin 27 to the microprocessor 11.

The purpose of the wait states generator 37, in this specific computer system implementation, is to slow down operation of the microprocessor 11 when a condition exists that requires time for the peripheral circuits 17, 19, 21, and 23 to complete a certain operation before the microprocessor 11 is allowed to proceed with its processing. This has become necessary with increasing speeds of operation of the microprocessor 11. Under a particular combination of circumstances described below, an operation of the interconnected peripheral circuits can take longer than the time allowed by the microprocessor for operation that needs to be simultaneously completed.

The NOR-gate 41 has a second input 40 from a circuit 36 that generates wait states in an interrupt acknowledge machine cycle of the CPU 11, as discussed above and at pages 300 and 301 of the above-cited Zilog book. An external wait states signal can also be applied to the pin 27 through a circuit 43 as a third input to the NOR-gate 41.

The daisy-chained interconnection of the peripherals 17, 19, 21 and 23 is a standard arrangement and is described at pages 293-304 of the previously cited Zilog book. Therefore, the operation of the daisy chain is only briefly summarized herein. Since the microprocessor 11 can communicate with only one of the peripheral devices at a time, the peripheral devices are connected in a daisy chain circuit that determines which peripheral will receive the attention of the central processing unit in cases where more than one peripheral at a time wants to be serviced by the CPU 11. The left-hand most peripheral 17 is given the highest priority, the next peripheral 19 the next-highest priority, and so forth, until the right-hand most peripheral circuit 23 has the lowest priority.

Each of the peripheral chips has three pins which are interconnected in a manner to resolve such a conflict. One such pin is connected to the control line 34 that is connected to the interrupt pin of the microprocessor 11. When any one of the peripheral chips 17, 19, 21 or 23 desires to be serviced by the microprocessor 11, it causes the pin connected to the interrupt line 34 to become active. That peripheral chip will be serviced by the microprocessor 11 unless, or until, a higher priority peripheral chip makes such an interrupt request.

The way in which this priority is recognized utilizes the other two-mentioned pins of each peripheral device. An interrupt enable input (IEI) of the highest priority peripheral chip 17 is connected through a series resistance to a positive voltage supply. An interrupt enable output (IEO) pin is connected by a wire 47 to the IEI input of the next peripheral chip 19 in the chain. Similarly, the IEO output of the chip 19 is connected by a conductor 49 to the IEI input of the chip 21, and so forth. Each of the commercially available peripheral chips from Zilog, Inc. that is capable of generating an interrupt request operates to cause its IEO output pin to go to a low voltage at the same time that it activates its interrupt output on the control line 34. By bringing its IEO output low, this causes each of the lesser-priority peripheral chips to be disabled from requesting service by the microprocessor 11. Each peripheral can generate an interrupt signal only when voltage to its IEI pin is high. When the IEO voltage of the highest priority chip 17 goes low, for example, that immediately disables the next-highest priority chip 19 from gaining access to the central processing unit 11. That low input voltage is also then communicated to its IEO output, thus causing the IEI input of the next priority chip 21 to go low, and so forth. Some time is required for this voltage change to propagate along the chain of peripherals. Of course, the more peripheral chips that are included in the chain, the longer this process takes.

After the processing by the CPU 11 with a given peripheral chip is completed, the CPU 11 fetches from memory an operational code of its instructional set and causes that code to be placed on the data bus 13. In the case of the Z80 microprocessor, this code is a return from interrupt (RETI) instruction. Each of the peripheral chips receives that instruction because of its connection with the data bus 13, but only the one that has active interrupt processing taking place will respond to it. The instruction causes that one peripheral to be reset and bring its IEO output back to a high level. This then enables lower priority peripheral chips in the chain to have their interrupt signals recognized.

If a low priority peripheral, such as the chip 23, is being serviced by the CPU 11 and a higher priority peripheral, such as the hip 17, issues an interrupt signal, the IEO output of the chip 17 goes low which, after rippling down the chain, reaches the IEI input of the chip 23. In a special case where a RETI instruction is placed on the data bus 13 to terminate the interrupt operation of the lower priority chip 23 after the higher priority chip 17 has issued an interrupt request, the higher priority chip will recognize that the RETI code is not intended for it so will restore its IEO output high to enable the lower priority chip to act upon the RETI instruction. However, the lower priority chip 23 must be restored to an active status by its IEI input going high before the RETI instruction is removed from the data bus 13. This propagation time can take longer than the time that the RETI instruction remains on the data bus 13 because of the short operational code fetch machine cycle of a current high speed CPU 11.

Thus, the wait states generator 37 is provided according to the present invention to function in response to a RETI operational code on the data bus 13 to generate a wait states signal in its output 39 that lengthens the operational code fetch machine cycle of the CPU 11 by a number of clock cycles determined by control signals applied at inputs 51 and 53. The number of clock cycles that the CPU 11 is asked to wait in a given system depends upon the number and type of peripheral devices in the daisy chain. Also provided as part of the system of FIG. 1 is a common system clock signal 55 that is applied to each of the circuits thereshown. This clock signal is illustrated in FIG. 3A. An external reset signal 57 is also applied to each of these circuit chips.

Referring to FIG. 2, a block diagram of the wait states generator 37 is given. Each of the blocks is implemented in hard wired logic to perform the required functions. A first block 61 emulates the reading logic of the CPU 11 in order to generate a signal in a line 63 that tells the next block 65 to read the contents of the data bus 13 at the next clock rising edge. The resulting signal in the line 63 commences when all of the four inputs 28, 30, 31 and 43 to the logic block 61 are in a specific configuration and terminates one clock cycle later. The CPU control line 28 specifically inhibits line 63 from going active, when the CPU 11 is in the halt mode. The signal in the line 63 is illustrated in FIG. 3G of the timing diagram of FIG. 3. These sample pulses envelop the clock rising edges that are coincident in time with the existence of an operational code byte on the data bus 13, as shown in FIG. 3F. It will be noted that two successive operational code fetch machine cycles of the CPU 11 are illustrated in the timing diagram of FIG. 3, namely a first machine cycle 81 and a second machine cycle 83.

It will be noted from FIG. 3F that the RETI operational code is two bytes long and thus requires two CPU machine cycles to fetch it from memory 15 and onto the data bus 13. The first byte ED is read in the first machine cycle 81 and the second byte 4D is read in the second machine cycle 83. The wait states generator circuit of FIG. 2 looks for the existence of both bytes in that sequence. The Z80 microprocessor instruction set utilizes several two byte instructions, some of which share a common first byte, ED. Thus, the wait states generator circuit cannot be certain that the RETI instruction is on the data bus 13 until it reads the second byte 4D. However, the circuit of FIG. 2, in response to reading the first byte ED in a first machine cycle 81, initiates a wait state output in its line 39 by assuming that the second byte is going to be 4D. However, if the second byte is then read in the machine cycle 83 to be something other than 4D, the wait states signal in output line 39 is terminated. This results in only a single clock cycle of wait state $T_W$ being inserted in the second machine cycle 83.

Logic circuit block 65 generates three outputs. A first output 67 is a signal indicating the existence of the first RETI byte ED on the data bus and is shown in FIG. 3I. This causes the subsequent logic circuit 73 to initiate the addition of wait states $T_W$ into the second machine cycle 83 by applying the signal in the output line 39 of FIG. 3L to the WAIT input pin of the CPU 11. The output in line 69 normally assumes that the RETI instruction is being received on the data bus 13. However, if the second byte read during the second machine cycle 83 at the time of the second sampling pulse of FIG. 3G is not 4D, then the assumption is, of course, changed and the signal in the line 69 becomes inactive as a result of detecting some other byte. That will cause the wait signal in the output line 39 to be terminated immediately upon reading that second byte. However, if the second byte is detected to be 4D, that means the RETI instruction is being communicated on the data bus 13 to all of the peripheral units. The wait state signal 39, as shown in FIG. 3L, is then provided with a duration designated by control signals in the lines 51 and 53 to add to the machine cycle 83 the desired number of wait states $T_W$. In the example being shown, four wait state clock cycles are inserted into the second machine cycle 83 in order to provide enough time for the interrupt enable signal to propagate along the peripheral daisy chain circuit, as described above.

A third output of the logic block 65 in a line 71 detects whether a byte being read from the data bus 13 is a first byte of a two-byte instruction of the Z80 microprocessor instruction set. If it does detect such a two-byte instruction, then a signal in the line 71 communicates that to another logic block 75. The block 75, in response to the signals on line 71 and the microprocessor control line 31, emits a pulse at output 77, as illustrated in FIG. 3K, at the end of the second byte in order to reset the logic circuits 65. The output 77 is also active to reset the logic block 65, at the end of the machine cycle immediately after a non-maskable interrupt acknowledge cycle.

When the CPU 11 relinquishes the system bus to, for example, a direct memory access (DMA) chip, its control line 29 becomes active. This causes suspension of the operation of logic blocks 65, 73 and 75, until the CPU 11 regains control of the system bus.

The number of wait states $T_W$ which the generator 37 may be programmed to insert into the second machine cycle 83 is determined by control signal lines 51 and 53. The values of control signals 51 and 53, therefore, ultimately determine the number of wait states $T_W$ which the generator 37 will cause to be inserted into the second machine cycle 83. The number of wait states $T_W$ to be inserted should be sufficient to cause the interval between the T4 clock falling edges of the machine cycles 81 and 83 to be equal to or longer than the sum of the following three times:

1. The interval between the clock falling edge of the T4 clock cycle of the machine cycle 81 and when the highest priority chip 17 has restored its IEO output to a high level;
2. The time required for a logic high to propagate through the peripheral chips 19 and 21 to the IEI input of the lowest priority peripheral chip 23; and 3. The time required by the lowest priority chip 23 of its IEI input being high, prior to the T4 clock falling edge of the machine cycle 83.

The system as illustrated in FIG. 1 shows the CPU 11 and new wait states generator 37 to be separate chips. This is certainly one way of providing the system described but it is also possible to combine both of those circuits onto a single integrated circuit chip, especially in light of current packing densities. Indeed, on or more peripheral circuits can also be included on such a single chip, as well as other system components, as desired.

Although the present invention has been described with respect to a preferred embodiment utilizing commercially available integrated circuit products, it will be understood that the invention is entitled to protection within the full scope of the appended claims.

It is claimed:

1. A computer system, comprising:
    a data bus,
    a central processing unit (CPU) connected to said data bus and having a machine cycle of a pre-determined minimum number of clock cycles in duration for reading an operational code segment from a memory connected to said data bus, and for reading a return from interrupt (RETI) operational code on said data bus, said RETI operational code having first and second segments as part of a set of instructions stored in said memory, thereby requiring first and second successive machine cycles to read said return from interrupt operational code from the memory,
    a plurality of peripheral circuits connected to said data bus, connected by a common interrupt line to said CPU, and connected with each other via a daisy chain configuration such that the CPU can service one interrupt request from one peripheral circuit at a time, said peripheral circuits being individually responsive to said return from interrupt operational code, whereby the response to such a return from interrupt operational code functions to terminate an operation initiated after a peripheral circuit has generated an interrupt request to said CPU over said common interrupt line, and
    second machine cycle lengthening means in communication with said data bus and said CPU, said second machine cycle lengthening means including means for detecting on said data bus said first machine cycle of the first segment of said return from interrupt operational code, wherein said second machine cycle lengthening means is responsive to detection of said first machine cycle of the first segment of said return from interrupt operational code for causing said CPU to insert a programmable number of additional clock cycles into said second machine cycle,
    whereby additional time is provided for the daisy chain peripheral circuits to respond to the return from interrupt operational code before an end of said first and second machine cycles.

2. The computer system of claim 1 wherein said CPU is characterized by increasing the number of clock cycles in said second machine cycle by inserting therein one or more additional wait states, and further wherein said second machine cycle lengthening means includes means for causing said CPU to insert a programmable number of additional wait states therein in response to said first segment of said return from interrupt operational code being detected.

3. The computer system of claim 1 wherein said CPU and said second machine cycle lengthening means are provided as part of a single integrated circuit chip.

4. The computer system of claim 1 wherein said second machine cycle lengthening means includes means responsive only to detection on said data bus during said second machine cycle of the second segment of said return from interrupt operational code for causing said CPU to insert said programmable number of additional clock cycles into said second machine cycle.

5. The system of claim 1 wherein said CPU is characterized by allowing its said machine cycle to be lengthened by insertion of a programmable number of additional wait state clock cycles in response to a wait control signal, and further wherein said second machine cycle lengthening means includes means for generating said wait control signal when said at least one particular bit combination is detected on said data bus.

* * * * *